United States Patent
Svihla et al.

(10) Patent No.: US 11,614,001 B1
(45) Date of Patent: Mar. 28, 2023

(54) TURBINE CONTAINMENT

(71) Applicant: Progress Rail Locomotive Inc., LaGrange, IL (US)

(72) Inventors: Gary R. Svihla, Burr Ridge, IL (US); Shannon W. Omori, Evanston, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 0 days.

(21) Appl. No.: 17/524,490

(22) Filed: Nov. 11, 2021

(51) Int. Cl.
*F01D 25/24* (2006.01)
*F01D 25/30* (2006.01)

(52) U.S. Cl.
CPC ............. *F01D 25/24* (2013.01); *F01D 25/30* (2013.01); *F05D 2220/40* (2013.01); *F05D 2230/60* (2013.01)

(58) Field of Classification Search
CPC ...... F01D 25/24; F01D 25/30; F05D 2230/60; F05D 2240/40
See application file for complete search history.

(56) References Cited

U.S. PATENT DOCUMENTS

| | | | | |
|---|---|---|---|---|
| 2,925,952 A | * | 2/1960 | Garve | .................... F04D 29/444 |
| | | | | 415/206 |
| 4,721,441 A | | 1/1988 | Miyashita et al. | |
| 5,785,493 A | * | 7/1998 | Ojima | .................... F04D 29/162 |
| | | | | 415/173.1 |
| 5,868,552 A | * | 2/1999 | McKean | ............... F01D 17/143 |
| | | | | 415/111 |
| 5,975,845 A | * | 11/1999 | Ball | ....................... F01D 11/122 |
| | | | | 415/200 |
| 6,032,466 A | | 3/2000 | Woollenweber et al. | |
| 6,193,463 B1 | * | 2/2001 | Adeff | ..................... F04D 29/023 |
| | | | | 415/206 |
| 6,264,424 B1 | * | 7/2001 | Fuller | .................... F04D 29/023 |
| | | | | 415/206 |
| 6,364,634 B1 | | 4/2002 | Svihla et al. | |
| 6,499,884 B1 | | 12/2002 | Svihla et al. | |
| 6,499,969 B1 | | 12/2002 | Tombers et al. | |
| 6,896,479 B2 | | 5/2005 | Svihla et al. | |

(Continued)

FOREIGN PATENT DOCUMENTS

| | | |
|---|---|---|
| CH | 712614 B1 | 11/2020 |
| CN | 205841303 U | 12/2016 |

(Continued)

*Primary Examiner* — Igor Kershteyn
(74) *Attorney, Agent, or Firm* — von Briesen & Roper, s.c.

(57) ABSTRACT

A turbine assembly for a turbocharger and method of assembling is disclosed. The turbine assembly may comprise a turbine wheel coupled to a rotatable turbocharger shaft, and a turbine housing that at least partially encloses the turbine wheel. The turbine housing may include an exhaust diffuser configured to direct a flow of exhaust, a support member coupled to the exhaust diffuser by a clamp assembly, the clamp assembly, a diffuser gap and a support gap. The clamp assembly may be disposed on the exhaust diffuser and on the support member. The clamp assembly includes a containment ring and a clamp plate. The containment ring may include a channel. The clamp plate may be disposed in the channel. The diffuser gap may be disposed between the containment ring and the exhaust diffuser. The support gap may be disposed between the containment ring and the support member.

20 Claims, 6 Drawing Sheets

(56) References Cited

U.S. PATENT DOCUMENTS

| | | |
|---|---|---|
| 7,108,488 B2 | 9/2006 | Larue et al. |
| 7,371,047 B2 | 5/2008 | Burmester et al. |
| 8,128,865 B2 | 3/2012 | Jahnz et al. |
| 8,820,072 B2 | 9/2014 | Figura et al. |
| 8,858,156 B2 | 10/2014 | Swenson et al. |
| 9,127,690 B2 | 9/2015 | Knaack |
| 9,181,855 B2 | 11/2015 | Svihla et al. |
| 9,200,567 B2 | 12/2015 | Parker et al. |
| 9,279,343 B2 | 3/2016 | Knaack |
| 9,470,240 B2 | 10/2016 | Uneura |
| 9,482,240 B2 | 11/2016 | Gerard et al. |
| 9,546,563 B2 | 1/2017 | Panambur et al. |
| 9,726,020 B2 | 8/2017 | Loewenberg |
| 9,835,164 B2 | 12/2017 | Svihla et al. |
| 9,874,099 B2 | 1/2018 | Rexavier et al. |
| 9,915,172 B2 | 3/2018 | Annati et al. |
| 10,018,205 B2 | 7/2018 | Pinkney et al. |
| 10,119,417 B2 | 11/2018 | Bucking |
| 10,161,265 B2 | 12/2018 | Isayama et al. |
| 10,436,211 B2 | 10/2019 | McArdle et al. |
| 10,677,099 B2 | 6/2020 | Hossbach |
| 2002/0114693 A1* | 8/2002 | Bartholoma ............ F01D 25/24 |
| | | 415/196 |
| 2008/0304953 A1* | 12/2008 | Chen .................. F04D 29/4206 |
| | | 415/208.1 |
| 2010/0143111 A1 | 6/2010 | Kuehnel |
| 2010/0215506 A1 | 8/2010 | Heyes et al. |
| 2011/0041494 A1* | 2/2011 | Parker .................... F01D 25/24 |
| | | 60/605.1 |
| 2016/0097302 A1 | 4/2016 | Svihla et al. |
| 2016/0177960 A1 | 6/2016 | Svihla et al. |
| 2016/0177965 A1 | 6/2016 | Svihla et al. |
| 2017/0002828 A1 | 1/2017 | Rexavier et al. |
| 2018/0328373 A1 | 11/2018 | Aynacioglu et al. |
| 2020/0182137 A1 | 6/2020 | Carr et al. |
| 2021/0156304 A1 | 5/2021 | Kobielski et al. |

FOREIGN PATENT DOCUMENTS

| | | |
|---|---|---|
| CN | 207728444 U | 8/2018 |
| DE | 102015216319 A1 | 3/2017 |
| EP | 2865897 B1 | 4/2016 |
| JP | 3587350 B2 | 11/2004 |
| JP | 5598433 B2 | 10/2014 |

\* cited by examiner

TURBINE CONTAINMENT

TECHNICAL FIELD

The present disclosure relates generally to turbochargers and, more particularly, to turbochargers with burst containment in the event of turbine wheel failure.

BACKGROUND

Internal combustion engines, for example, diesel engines, gasoline engines, or natural gas engines, employ turbochargers to deliver compressed air for combustion in the engine. A turbocharger compresses air flowing into the engine, helping to force more air into combustion chambers of the engine. The increased supply of air allows for increased fuel combustion in the combustion chambers of the engine, resulting in increased power output from the engine.

A typical turbocharger includes a shaft, a turbine wheel connected to one end of the shaft, a compressor impeller (sometimes referred to as a compressor wheel) connected to the other end of the shaft, and bearings to support the shaft. Separate housings connected to each other enclose the compressor impeller, the turbine wheel and the bearings. Exhaust from the engine expands over the turbine wheel and rotates the turbine wheel. The turbine wheel in turn rotates the compressor impeller via the shaft. The compressor impeller receives cool air from the ambient surroundings and forces compressed air into combustion chambers of the engine.

Natural inherent material limitations, wear and tear of the compressor or turbine stage components, excessive speeds, or debris in the exhaust air or the intake air may cause the turbine wheel or the compressor impeller to fail. To prevent ejection of debris or oil in the event of a turbine wheel or compressor impeller failure, turbochargers typically rely on massive housings surrounding the wheels to absorb the tremendous amount of energy released during the failure. The massive housings, however, tend to increase the volume, weight and cost of the turbocharger.

U.S. Pat. No. 9,546,563 that issued Jan. 17, 2017 ("the '563 Patent") discloses various methods and systems for an axial turbine including a containment shroud. In one example, an axial turbine for use in an engine system comprises a turbine disc/blisk and a shroud housing the turbine disc/blisk, the shroud including a first region, a second region, and a third region. A thickness of the second region is dependent on a length between the first region and the third region, and the third region has a burst strength that under a burst condition retains one or more fragments of the turbine disc/blisk. While beneficial, better containment of a turbine wheel during a failure condition is desired.

SUMMARY OF THE DISCLOSURE

In one aspect of the present disclosure, a turbine assembly for a turbocharger is disclosed. The turbine assembly may comprise a turbine wheel coupled to a rotatable turbocharger shaft, and a turbine housing that at least partially encloses the turbine wheel. The turbine housing may include an exhaust diffuser configured to direct a flow of exhaust, a support member coupled to the exhaust diffuser by a clamp assembly, a clamp assembly, a diffuser gap and a support gap. The clamp assembly may be disposed on the exhaust diffuser and on the support member. The clamp assembly includes a containment ring and a clamp plate. The containment ring may include a channel. The clamp plate may be disposed in the channel. The diffuser gap may be disposed between the containment ring and the exhaust diffuser. The support gap may be disposed between the containment ring and the support member.

In another aspect of the present disclosure, a method of assembling a turbine housing for a turbocharger is disclosed. The turbine housing may include an exhaust diffuser and an annular support member, the exhaust diffuser configured to direct a flow of exhaust. The exhaust diffuser may include a diffuser step portion that includes a diffuser back, a diffuser plateau, a diffuser bore and a diffuser floor disposed between the diffuser back and the diffuser plateau. The diffuser plateau is disposed radially outward of the diffuser floor. The annular support member may include a support step portion that includes a support back, a support plateau, a support bore and a support floor disposed between the support back and the support plateau. The method may comprise disposing the containment ring on the support plateau and on the diffuser plateau, wherein the containment ring includes a channel, wherein the containment ring overlaps the support floor and overlaps the diffuser floor. The method may further comprise inserting a clamp plate inside the channel, the claim plate disposed between the exhaust diffuser and the support member, the claim plate including a clamp bore. The method may further comprise inserting a fastener in the diffuser bore, the clamp bore and the support bore, and coupling the exhaust diffuser to the support member with the fastener. When coupled together, the containment is secured against the diffuser back by the clamp plate, and the support member is secured to the clamp plate by the fastener. When secured a diffuser gap is disposed between the containment ring and the exhaust diffuser, and a support gap is disposed between the containment ring and the support member.

In a further aspect of the present disclosure, a turbocharger is disclosed. The turbocharger may include a rotatable turbocharger shaft, a turbine wheel disposed in a turbine housing and operably coupled to the turbocharger shaft. The turbine housing may include an exhaust diffuser configured to direct a flow of exhaust, a support member coupled to the exhaust diffuser by a clamp assembly, the clamp assembly disposed on the exhaust diffuser and on the support member, a diffuser gap and a support gap. The clamp assembly may include a containment ring and a clamp plate. The containment ring includes a channel. The containment ring may be annular in shape. The clamp plate is disposed in the channel. The diffuser gap may be disposed between the containment ring and the exhaust diffuser. The support gap may be disposed between the containment ring and the support member. The support gap may be L-shaped. The diffuser gap may be slit-like in shape.

Additional aspects are defined by the claims of this patent.

DETAILED DESCRIPTION

Figure 1:
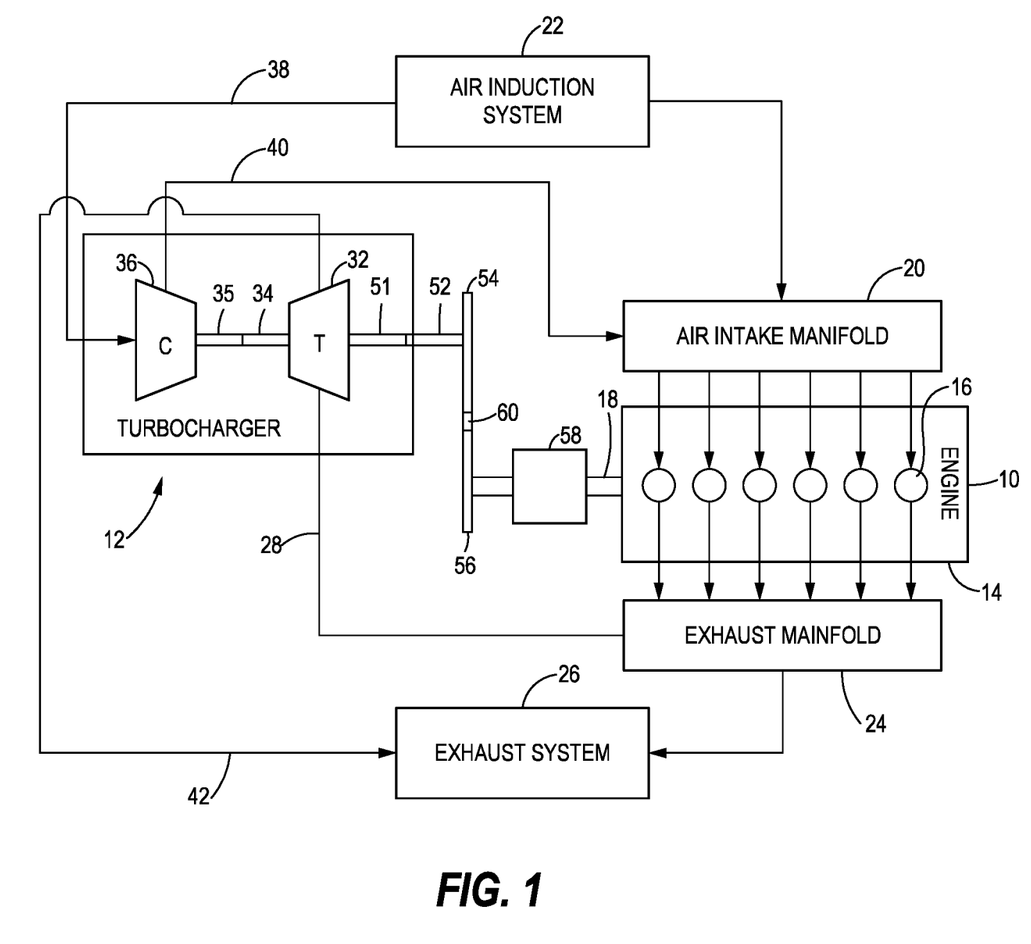
FIG. 1 is a schematic illustration of an exemplary internal combustion engine and a turbocharger in accordance with the present disclosure.

Referring to FIG. 1, an internal combustion engine 10 having an integrated turbocharger 12 in accordance with the present disclosure is illustrated schematically. The engine 10 may find applications in mobile machines (not shown) such as, but not limited to, vehicles, heavy mechanical equipment, large tractors, on-road vehicles, off-road vehicles, marine vessels and the like, and in stationary machines such as generator sets and pumps. The engine 10 may include a crankcase 14 that forms a plurality of compression cylinders 16. While six compression cylinders 16 are shown in an inline arrangement for illustration purposes, fewer or more compression cylinders 16 arranged in inline or alternative configurations within the crankcase 14, for example in a V-configuration, may be used. Each compression cylinder 16 may include a reciprocating piston (not shown) connected to a common engine output shaft 18. In the engine 10, the combustion of a fuel and air mixture in the compression cylinders 16 generates motive power that rotates the engine output shaft 18, and a resultant mixture of exhaust gas is produced as is known in the art.

The engine 10 may include an air intake manifold 20 that is selectively in fluid communication with each compression cylinder 16 and provides compressed intake air to the compression cylinders 16. Air may be provided to air intake manifold 20 by an air induction system 22 that draws air from the ambient atmosphere surrounding the engine 10 and the machine in which the engine 10 is implemented. The engine 10 may include a fuel tank (not shown) to store suitable fuel for combustion in the compression cylinders 16 of the engine 10. In various embodiments, the engine 10 may be configured to combust gasoline, diesel fuel, natural gas (liquefied or compressed) or other combustible energy sources, and the fuel tank will be configured as appropriate to store the fuel and provide the fuel to the engine 10 as required and known in the art. Compressed air from the air intake manifold 20 along with the fuel from the fuel tank provided to the compression cylinders 16 forms a combustible mixture that ignites when compressed or in the presence of a spark. Combustion byproducts are evacuated from each compression cylinder 16 through exhaust valves (not shown) to an exhaust manifold 24 that collects the exhaust gas from each compression cylinder 16, and at least a portion of the exhaust gases may be transmitted to an exhaust system 26 for after treatment prior to being released back into the atmosphere. In the engine 10, the intake air in the air intake manifold 20 as well as the exhaust gas released to the exhaust manifold 24 are under pressure.

In the illustrated embodiment, the turbocharger 12 is integrated with the engine 10 to provide compressed air with greater pressure to the air intake manifold 20. As schematically illustrated in FIG. 1, the turbocharger 12 may be fluidly connected to the exhaust manifold 24 and arranged to receive pressurized exhaust gas therefrom via a high pressure exhaust gas line 28. A turbocharger housing 30 of the turbocharger 12 is configured so that the pressurized exhaust gas from the high pressure exhaust gas line 28 acts on a turbine wheel 32 mounted on a turbocharger shaft 34 within the turbocharger housing 30. The turbocharger 12 may further include a compressor impeller 36 mounted via a stud 35 that is coupled to the turbocharger shaft 34 for rotation with the turbocharger shaft 34 and the turbine wheel 32. The pressurized exhaust gas from the high pressure exhaust gas line 28 is directed at the turbine wheel 32 to create exhaust torque on the turbocharger shaft 34. When the exhaust gas temperature and pressure are sufficient, the exhaust torque causes the turbine wheel 32 to rotate the turbocharger shaft 34 and stud 35 and the compressor impeller 36. The compressor stage 62 (FIG. 3) of the turbocharger 12 (FIG. 1) in which the compressor impeller 36 is disposed may receive air from the air induction system 22 via a low pressure air line 38. The rotating compressor impeller 36 compresses the air from the air induction system 22 and outputs compressed air to the air intake manifold 20 via a high pressure air line 40 for addition to the air coming directly from the air induction system 22 and the fuel from the fuel tank (not shown). After powering the turbine wheel 32, the spent exhaust gas is discharged by to the exhaust system via a low pressure exhaust gas return line 42.

During some operating conditions of the engine 10, it may be desirable to drive the turbine wheel 32 of the turbocharger 12 even though the temperature and pressure of the exhaust gas in the high pressure exhaust gas line 28 are insufficient to rotate the turbine wheel 32 or to rotate the turbine wheel 32 at a desired speed. For example, at low engine speeds such as when the engine 10 is idling, emissions of pollutants such as nitrous oxides (NOx) can increase and low exhaust temperatures can make exhaust after treatment systems in the exhaust system 26 ineffective. In one embodiment, to selectively provide direct drive to the turbocharger 12 by the engine 10 when the operating conditions dictate, the engine output shaft 18 may drive the turbocharger shaft 34 when the exhaust gas will not drive the turbine wheel 32, and may be disengaged when the exhaust gas will create sufficient torque and rotate the turbine wheel 32 and the compressor impeller 36 at sufficient speeds so that direct drive by the engine 10 is unnecessary.

In an embodiment, a sun gear shaft 51 (FIG. 1) may be operatively coupled to the turbine wheel 32. A carrier shaft 52 may be operatively coupled to the sun gear shaft 51 and may have a carrier drive gear 54 (FIG. 1) mounted thereon and rotatable therewith. As illustrated in FIG. 1, an operative connection between the engine 10 may be provided by a turbocharger drive gear 56 connected to a gear train or transmission 58 that is driven by the engine output shaft 18. A turbocharger sun gear 55 (FIG. 3) may be operatively connected to the carrier drive gear 54 (FIG. 1) which may be operatively connected to one or more idler gears 60 so that the carrier shaft 52 will spin at a desired speed and direction relative to the engine output shaft 18. In other embodiments that utilize the turbine assembly 71 disclosed herein, other appropriate drive mechanisms and arrangements may be utilized to drive the turbine wheel 32 and compressor impeller 36.

Figure 2:
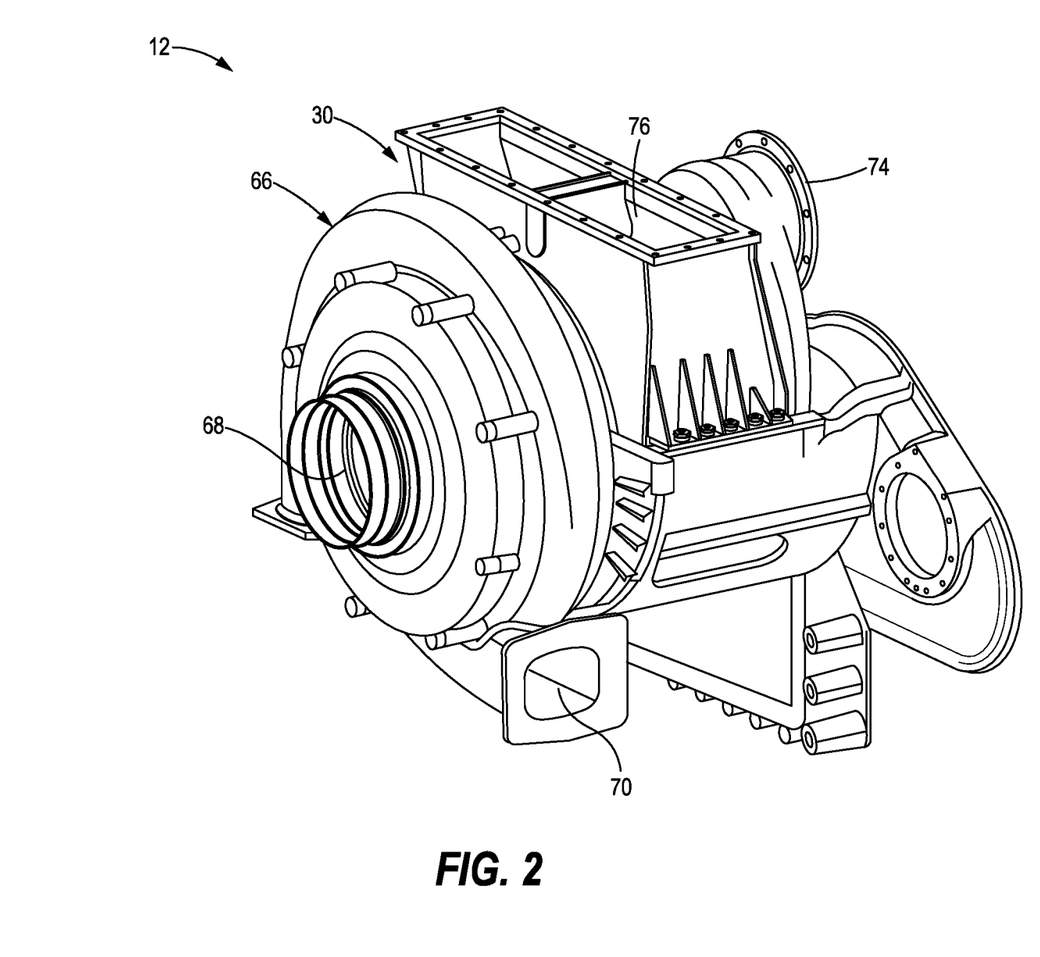
FIG. 2 is perspective view of an exemplary configuration of the turbocharger of FIG. 1.
Figure 3:
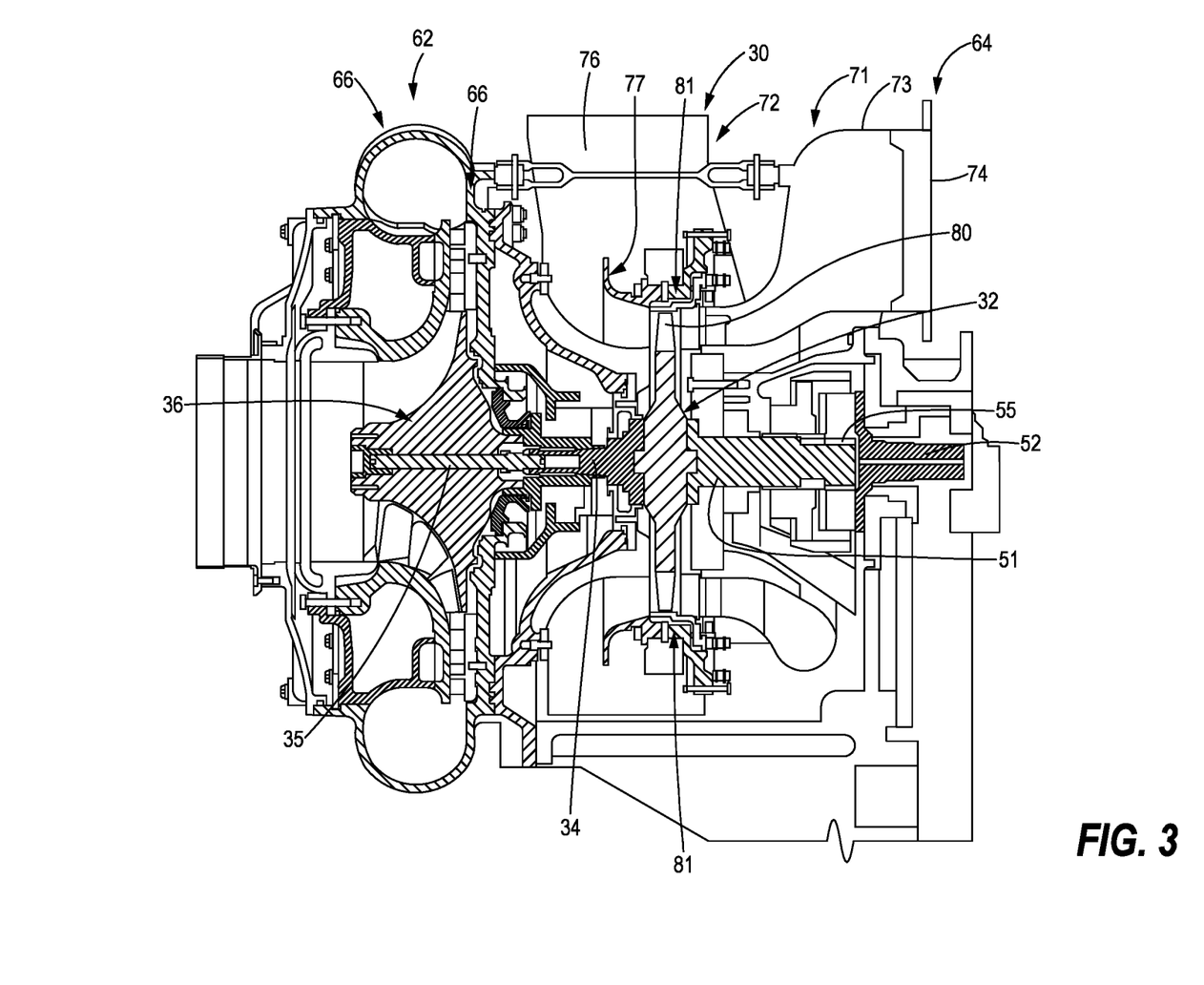
FIG. 3 is a sectional view of an exemplary configuration of the turbocharger of FIG. 2.

FIGS. 2-3 illustrate an exemplary embodiment of a turbocharger 12 that may be implemented with the engine 10 of FIG. 1. As shown in FIG. 3, turbocharger 12 may include a compressor stage 62 and a turbine stage 64 disposed in the turbocharger housing 30 (FIGS. 2-3). The turbocharger housing 30 comprises a compressor housing 66 and a turbine housing 72. The compressor stage 62 may embody a fixed geometry compressor impeller 36 (FIG. 3) attached via the stud 35, which is coupled to the turbocharger shaft 34, and configured to compress air received from the air induction system 22 (FIG. 1) to a predetermined pressure level before the air enters the engine 10 for combustion. Air may enter a compressor housing 66 (FIG. 2) via a compressor inlet 68 and exit the compressor housing 66 via a compressor outlet 70 (FIG. 2). As air moves through the compressor stage 62 (FIG. 3), the compressor impeller 36 may increase the pressure of the air which may be directed into the engine 10 (FIG. 1).

The turbine stage 64 (FIG. 3) may include a turbine assembly 71. The turbine assembly 71 includes a turbine housing 72 and a turbine wheel 32 operably connected to the rotatable turbocharger shaft 34 (which may comprise one or more shafts operably coupled). The turbine housing 72 at least partially encloses the turbine wheel 32. The turbine housing 72 may include a turbine inlet duct 73 having a turbine inlet 74, an exhaust diffuser 77 and a turbine exhaust duct 76. Exhaust gases exiting the engine 10 (FIG. 1) may enter the turbine inlet duct 73 (FIG. 3) via the turbine inlet 74 and flow toward the exhaust diffuser 77. The exhaust gases flow into the exhaust diffuser 77 and toward the turbine exhaust duct 76. The exhaust gases exit the turbine housing 72 via the turbine exhaust duct 76.

Figure 4:
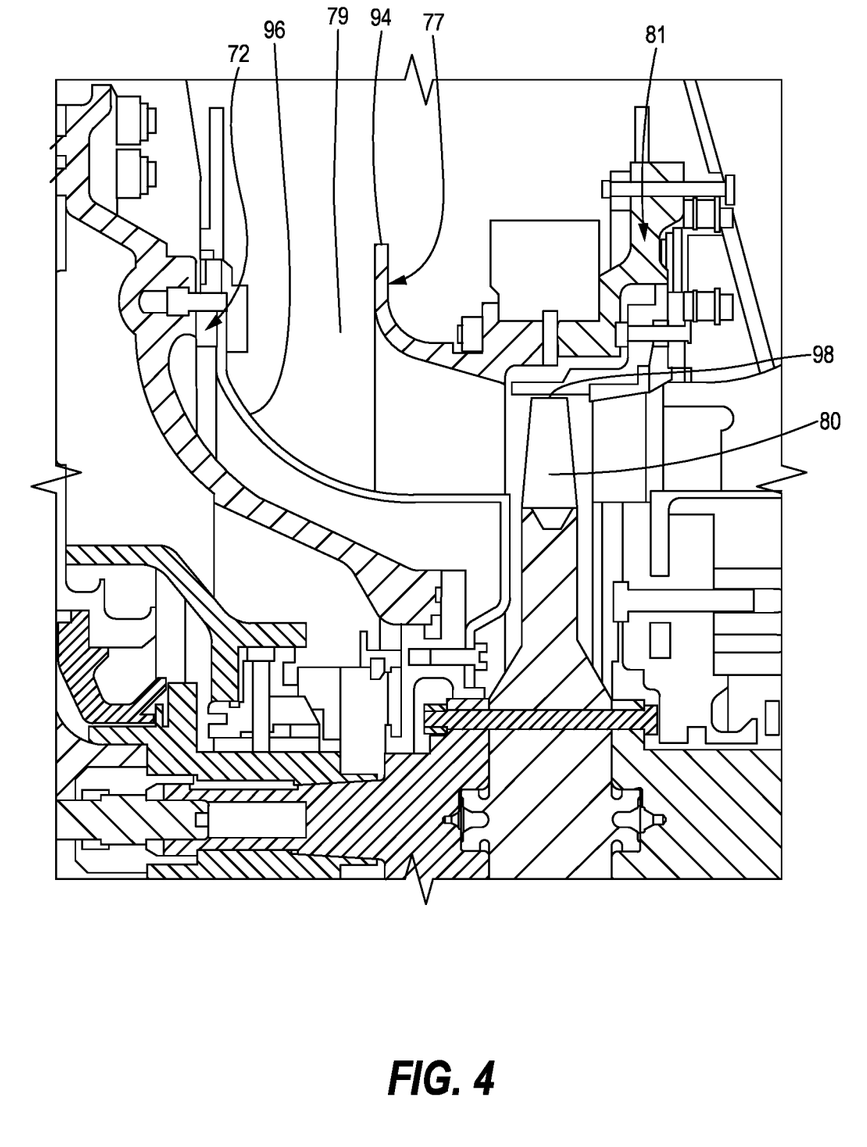
FIG. 4 is an enlarged view of a portion of FIG. 3.
Figure 5:
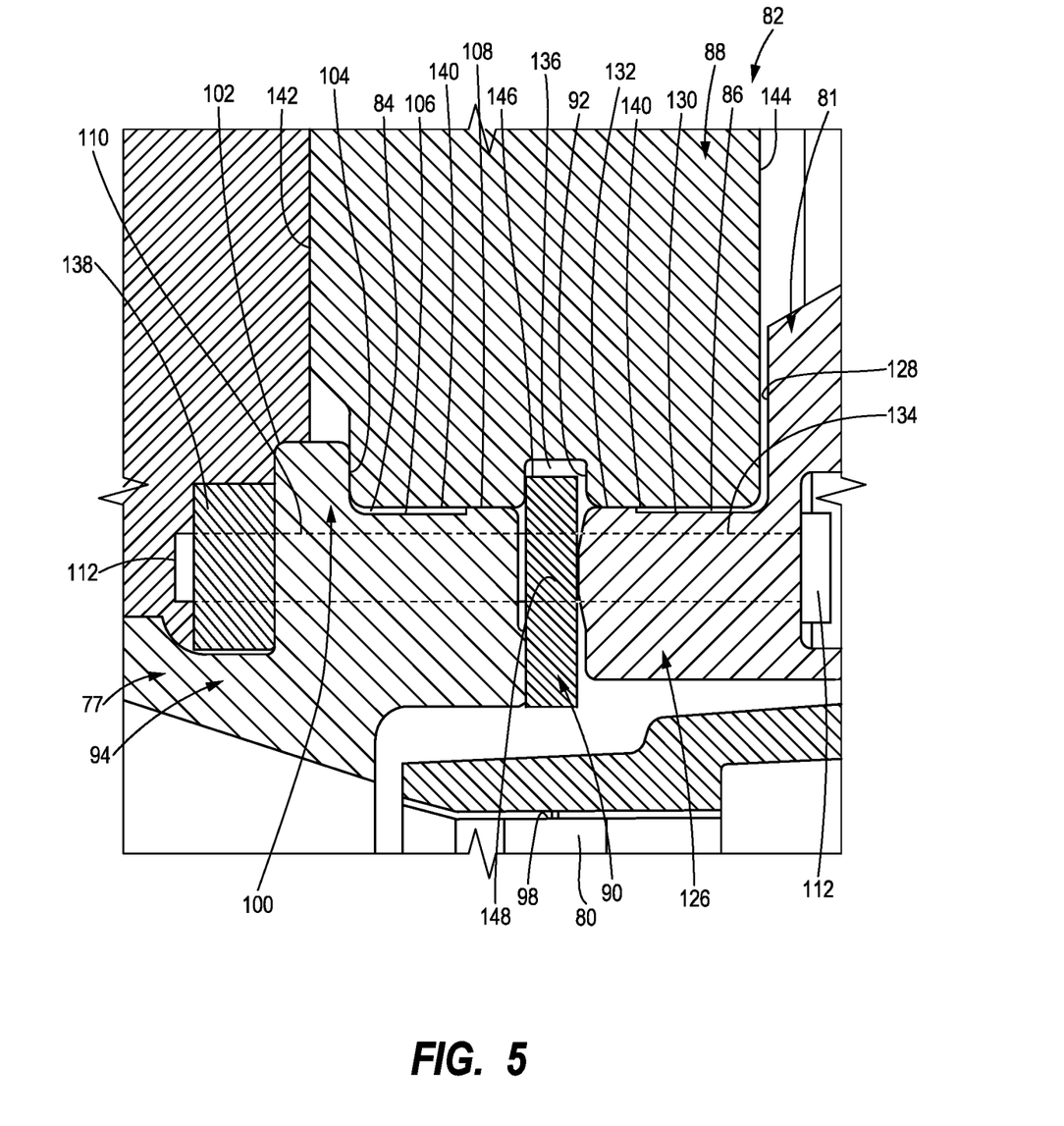
FIG. 5 is an enlarged view of a portion of FIG. 4.

As best seen in FIG. 4, the exhaust diffuser 77 defines an exhaust flowpath 79 that is configured to direct the flow of exhaust toward the turbine exhaust duct 76 (FIG. 3). The exhaust diffuser 77 is configured to reduce velocity of the exhaust gas stream via controlled expansion or volumetric increase thereby recovering pressure in the exhaust flow to improve efficiency of the turbine stage 64. In one embodiment, the exhaust diffuser 77 (FIG. 4) includes an outer sidewall 94 and an inner sidewall 96. The inner sidewall 96 is coupled to a portion of turbine housing 72 that is proximal to and coupled to the compressor housing 66. The outer sidewall 94 is disposed opposite the inner sidewall 96 and is coupled (via a clamp assembly 82) to a support member 81 (of the turbine housing 72) that is proximal or adjacent to the outer rim 98 of the turbine blades 80. As best seen in FIG. 5, the inner sidewall 96 includes a diffuser step portion 100. The diffuser step portion 100 may be disposed on a back face 102 (of the outer sidewall 94) that is outside of the exhaust flowpath 79 (FIG. 4) that is defined by the inner sidewall 96 and the outer sidewall 94. The diffuser step portion 100 (FIG. 5) includes a diffuser back 104, a diffuser floor 106, a diffuser plateau 108 and a diffuser bore 110. The diffuser floor 106 may be disposed between the diffuser back 104 and the diffuser plateau 108. The diffuser plateau 108 is disposed radially outward of the diffuser floor 106 (or is disposed radially outward of the diffuser floor 106). The diffuser bore 110 may extend through the diffuser step portion 100 and is configured to receive a portion of a fastener 112 (e.g. a screw, bolt or other appropriate fastener). In an embodiment, the diffuser bore 110 may be oriented generally parallel to the diffuser floor 106. The diffuser floor 106 is suspended over the turbine blade 80 so as to overlap a portion of the outer rim 98 of the turbine blade 80 that is disposed radially inward of the diffuser floor 106. A portion of the diffuser back 104 may abut a containment ring 88. Also, the diffuser plateau 108 abuts the containment ring 88. In an embodiment, the diffuser plateau 108 may be (relatively) distal from the diffuser back 104 and proximal to the clamp plate 90.

Figure 6:
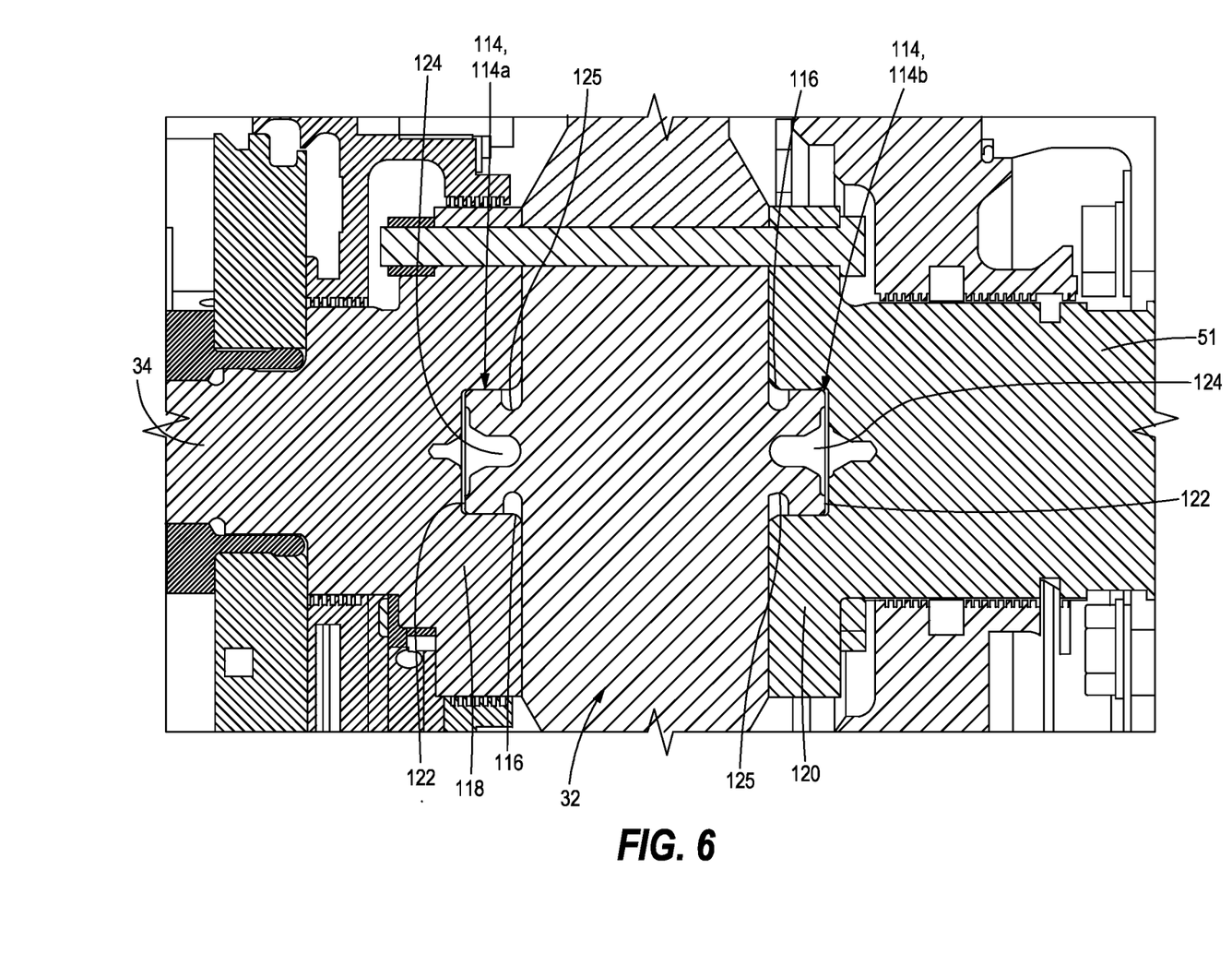
FIG. 6 is an enlarged view of a portion of FIG. 3.

Turning back to FIG. 3, as the hot exhaust gases move from the turbine inlet 74 through the turbine housing 72 and expand against the blades 80 of the turbine wheel 32, the turbine wheel 32 may rotate the compressor impeller 36 via its operable connection to the stud 35 The hot exhaust gases may also heat the turbine housing 72, which in turn may heat the compressor housing 66 and other components of the turbocharger 12 attached to or located near the turbine housing 72. As best seen in FIG. 6, the turbine wheel 32 may include a pair of pilot relief members 114 disposed on either side of the turbine wheel 32. In the embodiment shown in FIGS. 3 and 6, a first pilot relief member 114*a* is disposed in a notch 116 in the portion of a connection hub 118 that is operably coupled to the turbine wheel 32 and is operably coupled to the turbocharger shaft 34 (on the side of the turbine wheel 32 that is proximal to the compressor impeller 36). The second pilot relief member 114*b* is disposed in a notch 116 in a portion of a turbine hub 120 that is operably coupled to the turbine wheel 32 (and in this exemplary embodiment, is operably coupled to the sun gear shaft 51) on the side of the turbine wheel 32 that is distal from the compressor impeller 36. Each pilot relief member 114 is a joint between the turbine wheel 32 and the respective hubs (connection hub 118, turbine hub 120). Each pilot relief member 114 includes a pilot surface 122 and a groove 125 disposed about the outside of the pilot relief member 114. The pilot surface 122 is configured to have relatively small diameter and includes a relief recess 124. The relief recess 124 may be disposed in or near the center of the pilot surface 122. The pilot relief members 114 (a, b) are disposed symmetrically on opposite sides of the turbine wheel 32 and center the two adjoining shafts (in an embodiment, turbocharger shaft 34 and sun gear shaft 51) about the turbine wheel 32. Each pilot relief member 114 is configured as a fracturable joint that fractures off during a turbine burst failure condition or the like. The configuration of the pilot relief member 114 facilitate the primary pieces of the turbine wheel 32 exiting (moving) directly radially outward with little tumbling. The combination of the groove 125 on the outside of the pilot relief members 114 (a, b) and the relief recess 124 reduce the connection between the pilot relief members 114 (a, b) and the turbine wheel 32. During a failure event of the turbine wheel 32, the multiple pieces of the turbine wheel 32 may pull outward due to centrifugal load and the reduced portion (relief recess 124 and groove 125) of the pilot relief members 114 (a, b) results in both pilot relief members 114 (a, b) shearing off at about the same time. With the turbine wheel 32 now free of the pilot relief members 114 (a, b), the turbine wheel 32 pieces traverse the space between the connection hub 118 (which is operably coupled to, or may be integral with, the turbocharger shaft 34) and the turbine hub 120 (which is operably coupled to, or may be integral with, the sun gear shaft 51) which now act as guides as the pieces of the turbine wheel 32 fly radially outward and further prevent twisting motion or tumbling of the pieces.

Turning back to FIGS. 4-5, the turbine housing 72 may include or may further include the support member 81 and a clamp assembly 82; the turbine housing 72 may further include a diffuser gap 84 and/or a support gap 86.

The support member 81 is coupled to the exhaust diffuser 77 by the clamp assembly 82. The support member 81 may be generally annular. The support member 81 includes a support step portion 126 (FIG. 5). The support step portion 126 includes a support back 128, a support floor 130, a support plateau 132 and a support bore 134. The support bore 134 may extend through the support step portion 126 and is aligned with the diffuser bore 110 and is configured to receive another portion of the fastener 112. In an embodiment, the support bore 134 may be oriented generally parallel to the support floor 130. The support floor 130 is suspended over the turbine blade 80 so as to overlap a portion of the outer rim 98 of the turbine blade 80 that is disposed radially inward of the support floor 130. In an embodiment, the support back 128 may be free of contact with the containment ring 88. The support plateau 132 abuts the containment ring 88. In an embodiment, the support plateau 132 may be (relatively) distal from the support back 128 and proximal to the clamp plate 90. During a failure condition, such as turbine burst, pieces of the turbine wheel 32 may strike the support member 81. The support member 81 is configured to withstand the impact to remain relatively intact and whole to stop the turbine wheel 32 pieces from escaping out of the turbine exhaust duct 76.

The clamp assembly 82 includes a containment ring 88, a clamp plate 90, a channel gap 136 and the fastener 112. The clamp assembly 82 may also include one or more plates 138 or the like. The clamp assembly 82 is disposed on the exhaust diffuser 77 and on the support member 81. More specifically, in one embodiment, an inner side 140 of the containment ring 88 is disposed on the diffuser plateau 108 (of the exhaust diffuser 77) and on the support plateau 132 (of the support member 81).

The containment ring 88 includes an inner side 140 (radially inward), a front side 142, a back side 144 and a channel 92. The channel 92 is configured to receive the clamp plate 90. The inner side 140 is disposed between the front side 142 and the back side 144. The containment ring 88 is annular in shape. The inner side 140 of the containment ring 88 is disposed on the diffuser plateau 108 and overlaps the diffuser floor 106. The inner side 140 of the containment ring 88 is also disposed on the support plateau 132 and overlaps the support floor 130. The front side 142 of the containment ring 88 abuts the diffuser back 104 and the back side 144 of the containment ring 88 is spaced apart from the support back 128. The containment ring 88 is made of any appropriate material that possesses high strength at high exhaust gas temperatures. The containment ring 88 is configured to rigidly connect the exhaust diffuser 77 and the support member 81. The clamp assembly 82 is configured to secure the portion of the containment ring 88 between the clamp plate 90 and the diffuser back 104 (in other words the (bottom) portion of the containment ring 88 that is disposed between the channel 92 and the diffuser back 104) and leave the portion of the containment ring 88 that is disposed on the support member 81 unconstrained to allow the containment ring 88 to substantially deform while remaining centered and intact without damaging surrounding turbine housing 72 internal components, especially those of relatively thin cross-sections, during a burst turbine or similar event.

The clamp plate 90 is disposed in the channel 92 and may be annular in shape. The clamp plate 90 is disposed in the channel 92 to provide for the channel gap 136 between a radially outer side 146 of the clamp plate 90 and the channel 92 when the clamp plate 90 is disposed in the channel 92. The clamp plate 90 includes a clamp bore 148 therethrough. The clamp plate 90 is also disposed between the outer sidewall 94 of the exhaust diffuser 77 and the support member 81. In an embodiment a portion of the outer sidewall 94 that is adjacent to the clamp plate 90 may be spaced apart from the clamp plate 90 and another portion of the outer sidewall 94 that is adjacent to the clamp plate 90 may be in contact with the clamp plate 90. In an embodiment, a portion of the support member 81 that is adjacent to the clamp plate 90 may be spaced apart from the clamp plate 90 and another portion of the support member 81 that is adjacent to the clamp plate 90 may be in contact with the clamp plate 90.

The diffuser gap 84 is disposed between the containment ring 88 and the diffuser floor 106 of the exhaust diffuser 77. In one embodiment, the diffuser gap 84 may be generally slit-like in shape.

The support gap 86 is disposed between the front side 142 of the containment ring 88 and the support floor 130 and is disposed between the back side 144 of the containment ring 88 and the support back 128 of the support member 81. In an embodiment, the support gap 86 may be generally L-shaped. The support gap 86 and the diffuser gap 84 are disposed on opposite sides of the clamp plate 90.

The fastener 112 is disposed in the diffuser bore 110, in the clamp bore 148 and in the support bore 134. The fastener 112 is configured to secure the containment ring 88 the diffuser step portion 100. More specifically the fastener 112 secures the clamp plate 90 to the diffuser step portion 100. The portion of the clamp plate 90 disposed in the channel 92 exerts a force on the containment ring 88 that pushes (secures) the containment ring 88 against the diffuser back 104. The fastener 112 is also configured to secure the support step portion 126 to the clamp plate 90 and the diffuser step portion 100 by exerting force that "pulls" the support step portion 126 toward the clamp plate 90 and the diffuser step portion 100 while still maintaining the support gap 86. The fastener 112 may be a bolt, screw or other appropriate fastener. The fastener 112 may be configured to receive one or more plates 138 or the like.

Also disclosed is a method of assembling a method of assembling a turbine housing 72 for a turbocharger 12 is disclosed. The turbine housing 72 may include an exhaust diffuser 77 and an annular support member 81, the exhaust diffuser 77 configured to direct a flow of exhaust. The exhaust diffuser 77 may include a diffuser step portion 100 that includes a diffuser back 104, a diffuser plateau 108, a diffuser bore 110 and a diffuser floor 106 disposed between the diffuser back 104 and the diffuser plateau 108. The diffuser plateau 108 is disposed radially outward of the diffuser floor 106. The annular support member 81 may include a support step portion 126 that includes a support back 128, a support plateau 132, a support bore 134 and a support floor 130 disposed between the support back 128 and the support plateau 132. The method may comprise disposing the containment ring 88 on the support plateau 132 and on the diffuser plateau 108, wherein the containment ring 88 includes a channel 92, wherein the containment ring 88 overlaps the support floor 130 and overlaps the diffuser floor 106. The method may further comprise inserting a clamp plate 90 inside the channel 92, the clamp plate 90 disposed between the exhaust diffuser 77 and the support member 81, the clamp plate 90 including a clamp bore 148. The method may further comprise inserting a fastener 112 in the diffuser bore 110, the clamp bore 148 and the support bore 134, and coupling the exhaust diffuser 77 to the support member 81 with the fastener 112. When coupled together, the containment ring 88 is secured against the diffuser back 104 by the clamp plate 90, and the support member 81 is secured to the clamp plate 90 by the fastener 112. When secured a diffuser gap 84 is disposed between the containment ring 88 and the exhaust diffuser 77, and a support gap 86 is disposed between the containment ring 88 and the support member 81.

INDUSTRIAL APPLICABILITY

Turbine wheels 32 undergo various stresses over their life span due to aerodynamic, thermal and mechanical loads. Turbine wheels 32 may experience swings in temperature from turbine inlet 74 exhaust gas temperature variation. Mechanical loading from aerodynamic forces combined with centrifugal loads during turning can fatigue both the turbine blades 80 and turbine wheel 32 over time. Occasionally, the turbine wheel 32 may fracture or break apart. The failure condition associated with such turbine wheel 32 failure may be referred to as a "burst turbine". Burst turbine may occur during normal operating speeds or may occur when a turbocharger 12 is operating past nominal maximum speed and temperature. When a burst turbine event occurs in the latter scenario, far more energy may need to be contained and dissipated than when the burst turbine is related to fatigue failure at normal operating speeds. The disclosed turbine housing 72 provides energy dissipation and containment of material (e.g., broken turbine wheel 32 fragments, pieces of surrounding components, or the like) and oil in the turbine housing 72 during failure conditions such as burst turbine.

A burst turbine wheel 32 expels significant energy and requires correspondingly stout surrounding structure. During a burst turbine event, a crack may develop near the turbine wheel 32 centerline and then propagates outward to form multiple pieces. A pair of pilot relief members 114 on either side of the turbine wheel 32 that each have a (small diameter) pilot surface 122 that includes a relief recess 124 help to ensure that the primary pieces of the turbine wheel 32 exit (move) directly radially outward with little tumbling.

Radially outward moving turbine blades 80 strike the exhaust diffuser 77 and the support member 81 where coupled together by the clamp assembly 82. The containment ring 88, which possesses high strength at high exhaust gas temperatures, contains the energy. The containment ring 88 rigidly connects the exhaust diffuser 77 and the support member 81 yet does not break through those components during the burst turbine event.

By securing the portion of the containment ring 88 between the clamp plate 90 and the diffuser back 104 (in other words the (bottom) portion of the containment ring 88 that is disposed between the channel 92 and the diffuser back 104) and leaving the portion of the containment ring 88 that is disposed on the support member 81 unconstrained, the containment ring 88 is able to substantially deform while remaining centered and intact without damaging surrounding turbine housing 72 internal components, especially those of relatively thin cross-sections.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A turbine assembly for a turbocharger, the turbine assembly comprising
    a turbine wheel coupled to a rotatable turbocharger shaft; and
    a turbine housing that at least partially encloses the turbine wheel, the turbine housing including:
        an exhaust diffuser configured to direct a flow of exhaust;
        a support member coupled to the exhaust diffuser by a clamp assembly;
        the clamp assembly disposed on the exhaust diffuser and on the support member, the clamp assembly including a containment ring and a clamp plate, the containment ring including a channel, the clamp plate disposed in the channel;
        a diffuser gap disposed between the containment ring and the exhaust diffuser; and
        a support gap disposed between the containment ring and the support member.

2. The turbine assembly of claim 1, wherein the support gap is L-shaped.

3. The turbine assembly of claim 1, wherein the diffuser gap is slit-like in shape.

4. The turbine assembly of claim 1, in which the turbine wheel includes a pilot relief member configured as a fracturable joint.

5. The turbine assembly of claim 1, wherein the clamp plate is disposed between the exhaust diffuser and the support member.

6. The turbine assembly of claim 5 in which the exhaust diffuser includes a diffuser step portion that includes a diffuser back, a diffuser plateau and a diffuser floor disposed between the diffuser back and the diffuser plateau, the diffuser plateau disposed radially outward of the diffuser floor,
    wherein the containment ring is disposed on the diffuser plateau and overlaps the diffuser floor.

7. The turbine assembly of claim 6 in which the support member includes a support step portion that includes a support back, a support plateau and a support floor disposed between the support back and the support plateau,
    wherein the containment ring is disposed on the support plateau and overlaps the support floor.

8. The turbine assembly of claim 7, wherein the containment ring is adjacent to the diffuser back and is spaced apart from the support back.

9. A method of assembling a turbine housing for a turbocharger, the turbine housing including an exhaust diffuser and an annular support member, the exhaust diffuser configured to direct a flow of exhaust,
    wherein the exhaust diffuser includes a diffuser step portion that includes a diffuser back, a diffuser plateau, a diffuser bore and a diffuser floor disposed between the diffuser back and the diffuser plateau, the diffuser plateau disposed radially outward of the diffuser floor,
    wherein the annular support member includes a support step portion that includes a support back, a support plateau, a support bore and a support floor disposed between the support back and the support plateau,
    the method comprising:
    disposing a containment ring on the support plateau and on the diffuser plateau, wherein the containment ring includes a channel, wherein the containment ring overlaps the support floor and overlaps the diffuser floor;
    inserting a clamp plate inside the channel, the clamp plate disposed between the exhaust diffuser and the support member, the clamp plate including a clamp bore;
    inserting a fastener in the diffuser bore, the clamp bore and the support bore; and
    coupling the exhaust diffuser to the support member with the fastener, wherein when coupled together, the containment ring is secured against the diffuser back by the clamp plate, and the support member is secured to the clamp plate by the fastener, wherein when secured a diffuser gap is disposed between the containment ring and the exhaust diffuser, and a support gap is disposed between the containment ring and the support member.

10. The method of claim 9, wherein the support gap is L-shaped.

11. The method of claim 10, wherein the diffuser gap is slit-like in shape.

12. The method of claim 11, wherein the containment ring is adjacent to the diffuser back and is spaced apart from the support back.

13. A turbocharger comprising:
a rotatable turbocharger shaft; and
a turbine wheel disposed in a turbine housing and operably coupled to the turbocharger shaft, the turbine housing including:
an exhaust diffuser configured to direct a flow of exhaust;
a support member coupled to the exhaust diffuser by a clamp assembly;
the clamp assembly disposed on the exhaust diffuser and on the support member, the clamp assembly including a containment ring and a clamp plate, the containment ring including a channel, wherein the containment ring is annular in shape, the clamp plate disposed in the channel;
a diffuser gap disposed between the containment ring and the exhaust diffuser; and
a support gap disposed between the containment ring and the support member,
wherein the support gap is L-shaped,
wherein the diffuser gap is slit-like in shape.

14. The turbocharger of claim 13, in which the exhaust diffuser includes a diffuser step portion that includes a diffuser back, a diffuser plateau and a diffuser floor disposed between the diffuser back and the diffuser plateau, the diffuser plateau disposed radially outward of the diffuser floor,
wherein the containment ring is disposed on the diffuser plateau and overlaps the diffuser floor.

15. The turbocharger of claim 14, in which the support member includes a support step portion that includes a support back, a support plateau and a support floor disposed between the support back and the support plateau,
wherein the containment ring is disposed on the support plateau and overlaps the support floor.

16. The turbocharger of claim 15, wherein the containment ring is adjacent to the diffuser back and is spaced apart from the support back.

17. The turbocharger of claim 16, in which the diffuser step portion further includes a diffuser bore, and in which the support step portion further includes a support bore, in which clamp assembly further includes a fastener disposed in the diffuser bore and the support bore.

18. The turbocharger of claim 13, in which the turbine wheel includes a pair of pilot relief members, each pilot relief member configured as a fracturable joint.

19. The turbocharger of claim 18, in which each pilot relief member includes a pilot surface with a relief recess.

20. The turbocharger of claim 13 further comprising:
a compressor housing connected to the turbine housing;
a compressor impeller rotatably disposed within the compressor housing, the turbine wheel operably connected to the compressor impeller.

* * * * *